United States Patent [19]

O'Neill

[11] Patent Number: 5,728,993
[45] Date of Patent: Mar. 17, 1998

[54] LASER CUTTING OF MATERIALS WITH PLURAL BEAMS

[75] Inventor: William O'Neill, Liverpool, England

[73] Assignee: The BOC Group plc, Windlesham, England

[21] Appl. No.: 693,930

[22] Filed: Aug. 5, 1996

[30] Foreign Application Priority Data

Aug. 5, 1995 [GB] United Kingdom ............... 95 16099

[51] Int. Cl.$^6$ .................................................. B23K 26/06
[52] U.S. Cl. ........................... 219/121.67; 219/121.75; 219/121.77; 219/121.84
[58] Field of Search ......................... 219/121.67, 121.72, 219/121.73, 121.75, 121.76, 121.77, 121.84

[56] References Cited

U.S. PATENT DOCUMENTS

| | | |
|---|---|---|
| 3,604,890 | 9/1971 | Mullaney . |
| 5,103,073 | 4/1992 | Danilov et al. ............ 219/121.76 |
| 5,463,200 | 10/1995 | James et al. ............... 219/121.77 |
| 5,571,429 | 11/1996 | Smith et al. ............... 219/121.73 |

FOREIGN PATENT DOCUMENTS

| | | | |
|---|---|---|---|
| 0 458 180 A3 | 5/1991 | European Pat. Off. . | |
| 0 618 037 A1 | 3/1994 | European Pat. Off. . | |
| 4215561 | 5/1993 | Germany ............... | 219/121.67 |
| 59-87996 | 5/1984 | Japan .................. | 219/121.67 |
| 64-53794 | 3/1989 | Japan .................. | 219/121.75 |
| 64-62294 | 3/1989 | Japan .................. | 219/121.84 |
| 1-143783 | 6/1989 | Japan .................. | 219/121.75 |
| 1-143784 | 6/1989 | Japan .................. | 219/121.75 |
| 2-217187 | 8/1990 | Japan .................. | 219/121.75 |
| 2-263590 | 10/1990 | Japan .................. | 219/121.67 |
| 2-295688 | 12/1990 | Japan .................. | 219/121.72 |
| WO93/09909 | 5/1993 | WIPO . | |

*Primary Examiner*—Geoffrey S. Evans
*Assistant Examiner*—Gregory L. Mills
*Attorney, Agent, or Firm*—David A. Draegert; Salvatore P. Pace

[57] ABSTRACT

An apparatus for cutting a workpiece comprises optical means located in a single cutting head for splitting a beam of laser energy into two separate beams. The cutting head includes an inlet for oxygen under pressure and a nozzle for the outlet of the oxygen. At least one split beam is focused at a location above the surface of the workpiece such that when in use the area on the surface of the workpiece impinged by the split beam is greater than the area being impinged upon by the oxygen when leaving the nozzle.

5 Claims, 2 Drawing Sheets

5,728,993

LASER CUTTING OF MATERIALS WITH PLURAL BEAMS

FIELD OF THE INVENTION

The present invention relates to methods of and apparatus for cutting materials and in particular the cutting of thick sectioned steel using a low power laser cutter.

BACKGROUND OF THE INVENTION

A laser cutting process is known in which a relatively high power laser beam is focused onto the surface of a material to be cut. The laser energy sustains the material at its melting point and a high speed gas jet blows away the molten material to produce a cut. This known process provides the laser energy throughout the depth of the cut and thus requires a high power good quality beam in order to produce an acceptable cut.

European Patent Publication Number 0458180 describes a method of cutting a workpiece using a laser beam and a high pressure gas stream both being directed through a nozzle. The focal point of the laser beam is located at a distance above the surface of the workpiece to be cut such that it strikes the surface as a de-focused beam. This together with a high pressure oxygen or oxygen-rich gas jet produces, clean, sharp edges and a high quality surface finish on the cut face.

U.S. Pat. No. 3,604,890, describes a laser cutting system in which a beam of laser energy is caused to impinge on a partially silvered reflective surface so that it is split into two separate beams. Each beam is subsequently focused by an individual lens system such that one beam is focused at a point substantially at the surface of the workpiece to be cut, whilst the second beam is focused on said point and over a depth of focus larger than the depth of focus of said first beam. Each lens system is located in its own associated cutting head which includes a gas inlet for directing gas under pressure onto the area of the workpiece where the associated beam is focused. The use of two lens systems and two cutting heads renders the cutting system complicated and expensive to manufacture and to set up particularly for profile cutting.

In accordance with the present invention, there is provided a means of improving the efficiency of low power laser cutting, particularly of thick sectioned steel by splitting a laser beam such that one split beam has a greater depth of focus than the other split beam,

SUMMARY OF THE INVENTION

According to the present invention, an apparatus for cutting a workpiece comprises a source of laser energy, optical means for splitting a beam of laser energy when emanating from said source into two separate beams and focusing each split beam at a predetermined location relative to the workpiece, one beam having a greater depth of focus than the other beam and in which the optical means is located in a single cutting head which includes an inlet for oxygen, or an oxygen-rich gas under pressure, and a nozzle for the outlet thereof such that it impinges on the surface of the workpiece, at least one beam being focused at a location above the surface of the workpiece such that, in use, the area on the surface of the workpiece impinged by said one beam is greater than the area being impinged upon by the oxygen rich gas when leaving the nozzle.

DETAILED DESCRIPTION OF THE INVENTION

The apparatus for cutting a workpiece in accordance with the present invention comprises a source of laser energy, optical means for splitting the beam of laser energy created thereby, and focusing each of the separated beams at a predetermined location relative to the workpiece to be cut. In one embodiment of the invention, the optical means includes a diffractive optical element located at one end of the cutting head for splitting the beam of laser energy into the two separate beams, one split beam being directed towards a lens located adjacent the opposite end of the cutting head which focuses said one split beam at a location above the surface of the workpiece; the remaining split beam being focused by the diffractive optical element such that it passes unaltered through the lens.

In an alternative embodiment, the optical means includes a double element lens located at one end of the cutting head for splitting the beam of laser energy into the two separate beams, one split beam being directed towards a lens located adjacent the opposite end of the cutting head which focuses said one split beam at a location above the surface of the workpiece; the remaining split beam being focused by the double element lens such that it passes unaltered through the lens.

Figure 1:
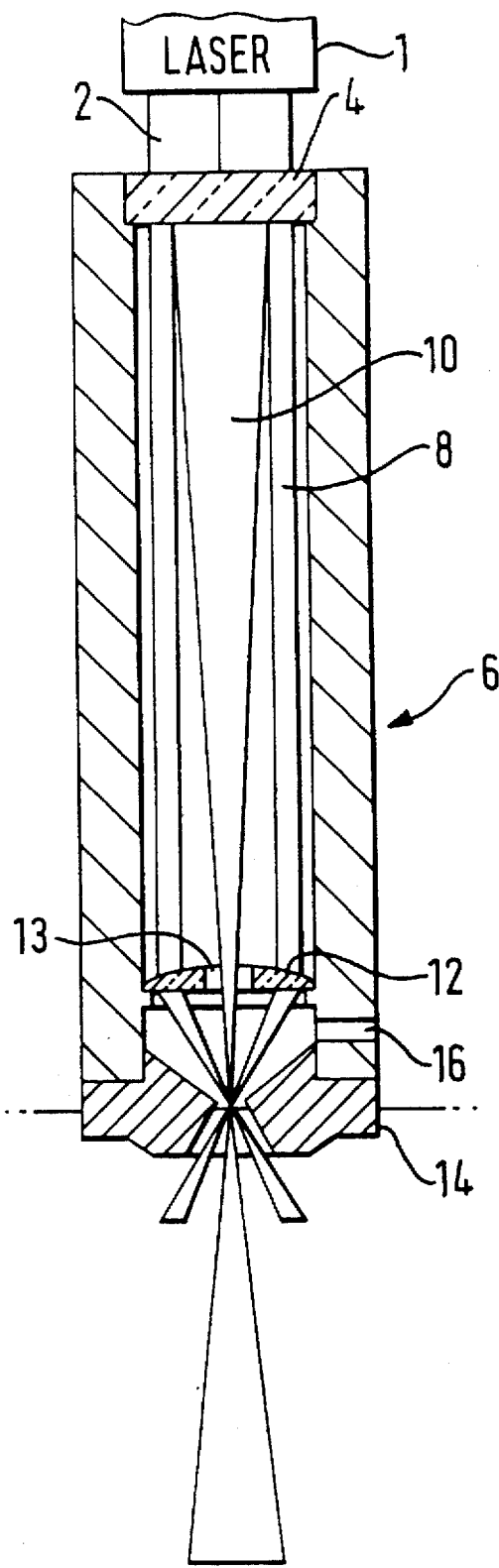
FIG. 1 is a schematic cross-section through the cutting head of a laser cutting apparatus.

Embodiments of the invention will now be described by way of example, reference being made to the Figures of the accompanying diagrammatic drawings. As shown in FIG. 1, a laser beam 2 emanating from a source 1 passes through a diffractive optical element 4 positioned at the upper (as shown) end of a cutting head 6. During its passage through the diffractive optical element 4 the beam 2 is split into two beams 8 and 10 which are both directed towards a lens 12 located adjacent the lower (as shown) end of the cutting head 6. The beam 10 is focused by the diffractive optical element 4 and passes unaltered through an opening 13 in the lens 12 to be focused at a point within the nozzle 14. The lens 12 focuses beam 8 at the same point or location as the beam 10 so that both beams 8 and 10 are focused at a point within the nozzle 14 at a predetermined distance above a workpiece (not shown) to be cut. As will be evident from FIG. 1, the beam 10 has a greater depth of focus than the beam 8.

It has been found that the wider focused beam 8 acts effectively as a preheat generator and with its wide spread at the surface of the workpiece provides a stable effect, whilst the deeper focused beam 10 provides energy to the lower reaches of the cut and allows a higher cutting speed.

Figure 2:
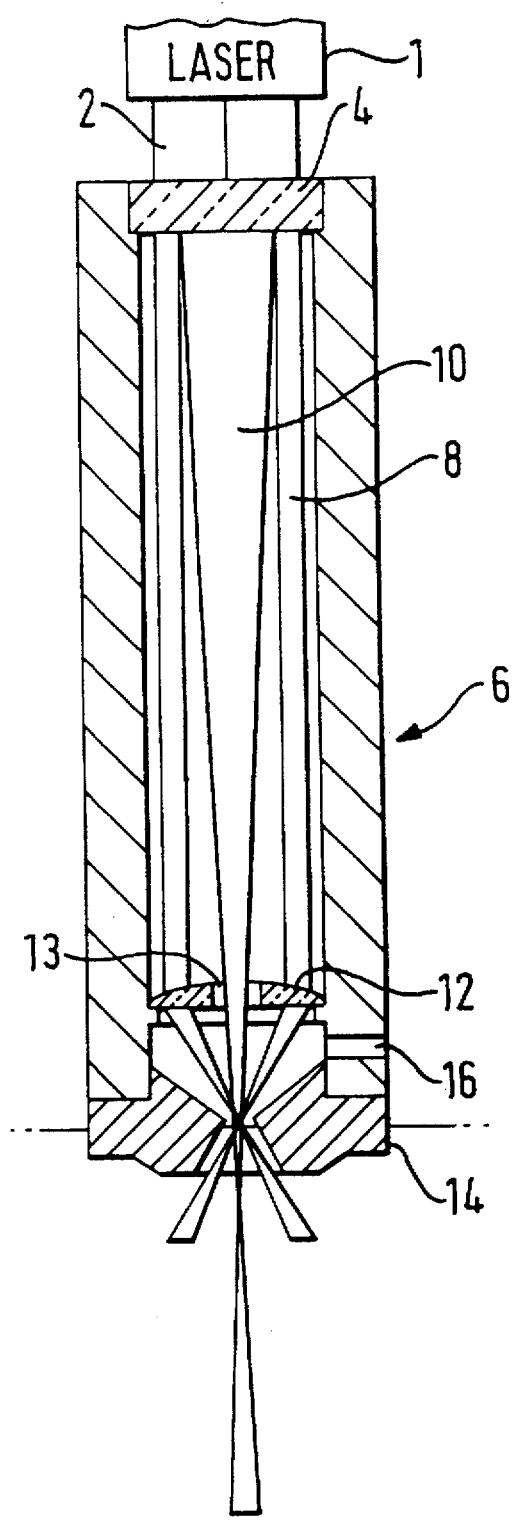
FIG. 2 is a schematic cross-section through the cutting head of FIG. 1 but illustrating the split beams being focused at spaced apart locations.

FIG. 2 illustrates the same cutting head 6 as shown in FIG. 1 but the diffractive optical element 4 and the lens 12 are arranged such that the beams 8, 10 are focused at spaced apart locations, the beam 8 being focused at a point within the nozzle 14 at a distance above the workpiece to be cut and the beam 10 being focused on or below the surface of the workpiece, that is, inside the cut.

Figure 3:
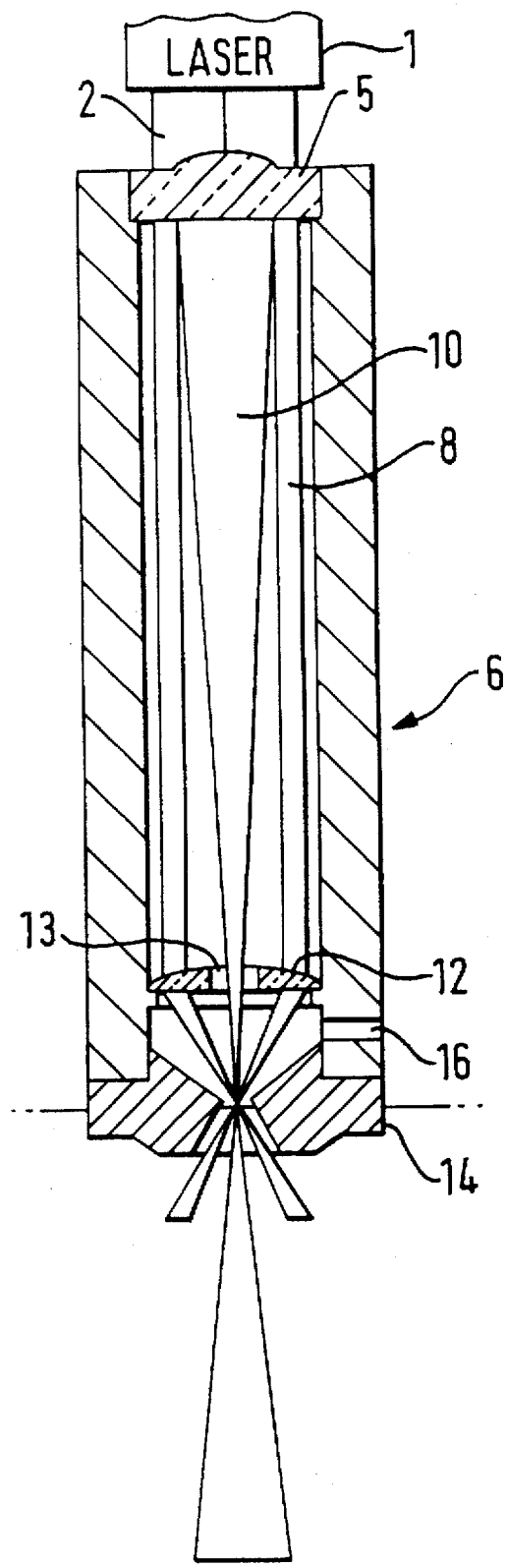
FIG. 3 is a schematic cross-section through the an alternative cutting head of a laser cutting apparatus.

The embodiment illustrated in FIG. 3 is substantially the same as that described with reference to FIGS. 1 and 2 and like reference numerals will indicate like features. In this embodiment, the diffractive optical element 4 is replaced by a double element lens 5 which effectively operates in a similar manner in that when the beam 2 passes therethrough it is split into two beams 8, 10 which pass along the inside of the cutting head 6 towards a lens 12 which focuses beam 8 at a position within nozzle 14. The beam 10 is focused by the double element lens 5 and passes unaltered through an opening 13 in the lens 12. As shown the beams 8, 10 are focused at the same point or location within the nozzle 14, that is above the surface of the workpiece. It will be appreciated that the workpiece to be cut is moved under the nozzle 14 at a slight distance therefrom, such that both beams strike the surface of the workpiece in a de-focused state.

It will be appreciated that only the beam 8 needs to be focused above the surface of the workpiece such that is strikes the surface in a de-focused state. The beam 10 can and is preferably focused at or below the surface of the workpiece, that is inside the cut.

It will be appreciated that the cutting heads illustrated in FIGS. 1, 2 and 3 are each supplied with a gas inlet 16 in a manner known per se for the introduction of a high pressure oxygen or oxygen rich gas which will exit the nozzle 14 as a jet to react with the workpiece and remove molten material to produce a cut. The nozzle 14 and the optical means are so dimensioned and arranged that the area on the surface of the workpiece impinged by the defocused beam 8 is always greater than the area being impinged upon by the oxygen or oxygen-rich gas jet.

A particular advantage of the embodiments described above is that the use of a single optical means located within a single cutting head to produce what is, in effect, two separate beams, has an advantage over the prior art in that it is far easier to set up for profile cutting operations.

I claim:

1. An apparatus for cutting a workpiece by impinging a laser beam on an area of a surface of the workpiece, comprising a source of laser energy, optical means for splitting a beam of laser energy when emanating from said source into first and second separate beams and focusing each beam when so split at a predetermined location relative to the workpiece, the second of said beams having a greater depth of focus than the first beam, characterized in that the optical means is located in a single cutting head which includes an inlet for oxygen or an oxygen-rich gas under pressure and a nozzle for the outlet of the oxygen or oxygen-rich gas such that the oxygen or oxygen-rich gas is impinged on a portion of the area on the surface of the workpiece, and that the optical means includes a beam splitting means located at one of two opposed ends of the cutting head and a lens located adjacent the other opposed end of the cutting head, wherein the optical means focuses the first beam at a location above the surface of the workpiece and focuses the second beam to pass unaltered through an opening in the lens.

2. An apparatus in accordance with claim 1, wherein the beam splitting means includes a diffractive optical element.

3. An apparatus in accordance with claim 1, wherein the beam splitting means includes a double element lens.

4. An apparatus in accordance with claim 1, wherein the nozzle is attached to the cutting head at an end immediately adjacent the workpiece.

5. An apparatus in accordance with claim 1, wherein one of said split beams is focused at a point within the nozzle, and the remaining split beam is focused at a point at or below the surface of the workpiece.

* * * * *